US010459884B1

(12) United States Patent
Godman (10) Patent No.: US 10,459,884 B1
(45) Date of Patent: Oct. 29, 2019

(54) FILESYSTEM BLOCK SAMPLING TO IDENTIFY USER CONSUMPTION OF STORAGE RESOURCES

(71) Applicant: Qumulo, Inc., Seattle, WA (US)

(72) Inventor: Peter J. Godman, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/505,562

(22) Filed: Jul. 8, 2019

Related U.S. Application Data (63) Continuation of application No. 15/854,447, filed on Dec. 26, 2017, now Pat. No. 10,346,355.

(60) Provisional application No. 62/438,852, filed on Dec. 23, 2016.

(51) Int. Cl.
| | |
|---|---|
| *G06F 17/30* | (2006.01) |
| *G06F 16/13* | (2019.01) |
| *G06F 3/06* | (2006.01) |
| *G06F 17/18* | (2006.01) |
| *G06F 16/17* | (2019.01) |
| *G06F 16/178* | (2019.01) |

(52) U.S. Cl.
CPC ............ *G06F 16/13* (2019.01); *G06F 3/064* (2013.01); *G06F 16/178* (2019.01); *G06F 16/1734* (2019.01); *G06F 17/18* (2013.01)

(58) Field of Classification Search
CPC .... G06F 16/13; G06F 16/178; G06F 16/1734; G06F 3/064; G06F 17/18
See application file for complete search history.

(56) References Cited

U.S. PATENT DOCUMENTS

| | | | |
|---|---|---|---|
| 6,892,211 B2 | 5/2005 | Hitz et al. | |
| 7,693,876 B2 | 4/2010 | Hackworth et al. | |
| 7,937,421 B2 | 5/2011 | Mikesell et al. | |
| 8,782,655 B2* | 7/2014 | Blanding | G06F 9/5044 |
| | | | 718/104 |
| 8,849,764 B1* | 9/2014 | Long | G06F 11/1451 |
| | | | 707/646 |
| 9,244,975 B2* | 1/2016 | Das | G06F 16/2453 |
| 9,244,976 B1* | 1/2016 | Zhang | G06F 16/2453 |
| 9,753,782 B2* | 9/2017 | Fang | H04L 67/1008 |
| 2003/0033308 A1* | 2/2003 | Patel | G06F 11/1076 |
| 2005/0223019 A1* | 10/2005 | Das | G06F 16/2462 |
| 2011/0202925 A1 | 8/2011 | Banerjee et al. | |
| 2012/0166478 A1* | 6/2012 | Das | G06F 16/2453 |
| | | | 707/769 |
| 2013/0311454 A1* | 11/2013 | Ezzat | G06F 16/256 |
| | | | 707/722 |

(Continued)

OTHER PUBLICATIONS

Office Communication for U.S. Appl. No. 15/854,447 dated May 6, 2019, pp. 1-31.

*Primary Examiner* — Jeff A Burke
(74) *Attorney, Agent, or Firm* — John W. Branch; Lowe Graham Jones PLLC (57) ABSTRACT

Providing a statistical analysis of all files in a file system based on random sampling of data blocks to identify individual user consumption of file system resources and characteristics of the files stored in the file system. In one or more of the various embodiments, the file system is based on information for a plurality of cylinder groups. Also, each cylinder group may include at one or more known locations at least three types of data structures that enable reverse mapping of data blocks to root directories.

20 Claims, 5 Drawing Sheets

(56) References Cited

U.S. PATENT DOCUMENTS

2014/0372384 A1* 12/2014 Long .................. G06F 11/1469
                                                                707/679
2016/0224430 A1*  8/2016 Long .................... G06F 16/907
2016/0306810 A1* 10/2016 Ni ........................ G06F 16/182

* cited by examiner

FILESYSTEM BLOCK SAMPLING TO IDENTIFY USER CONSUMPTION OF STORAGE RESOURCES

CROSS-REFERENCE TO RELATED APPLICATIONS

This Utility Patent Application is a Continuation of U.S. patent application Ser. No. 15/854,447 filed on Dec. 26, 2017, now U.S. Pat. No. 10,346,355 issued on Jul. 9, 2019, which is based on previously filed U.S. Provisional Patent Application Ser. No. 62/438,852 filed on Dec. 23, 2016, the benefit of the filing date of which is hereby claimed under 35 U.S.C. § 119(e) and § 120 and the contents of which are each further incorporated in entirety by reference.

TECHNICAL FIELD

Embodiments relate generally to managing entries in a filesystem, and more particularly, but not exclusively to determining usage of storage resources by users.

BACKGROUND

In today's society, it is common to use some form of a computing device to search for, access, and even exchange data with others over wired and/or wireless networks. This data may include different types of structured data, such as audio, video, image, messaging, program, and the like, as well as other types of unstructured data. Consequently, there is a demand for networked file systems that can store large amounts of diverse types of data while also providing relatively fast and reliable access to the stored data.

In response to this demand, various file systems are available to provide access to files that are stored in relatively large data stores. However, just providing access to relatively large networked data stores can be inadequate for many applications. In many instances, providing fast and reliable access over a network to stored data can be just as important as the amount of available storage on a data store. Additionally, although many data storage file systems enable a user to easily store large amounts of data, most do not provide efficiently identify users that over consume storage resources and their corresponding files that should be deleted or archived in a less expensive data store.

Also, some applications employ data backup mechanisms that require fast and reliable access to relatively large amounts of data in remotely located data stores. These back up mechanisms may employ mirroring, replication, or the like, which are typically used to copy large amounts of data to multiple data stores at different locations. There is a need for a file system that can rapidly identify a user that is over consuming their portion of data storage resources and also identify those user files that could be deleted or archived. Additionally, the efficiency and cost of employing these data backup mechanisms to mirror data may be reduced if unneeded files are quickly identified and deleted and other rarely used files are archived. Therefore, it is with respect to these considerations and others that the invention was made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION OF THE VARIOUS EMBODIMENTS

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "cluster" refers to multiple loosely coupled network devices that cooperate to provide a client access to a set of services, resources, and the like, over a network. The coupled network devices may be referred to as nodes, or members, in the cluster, and may be employed to increase reliability and/or availability of the access. In one embodiment, the network devices may operate as storage devices. However, the invention is not so constrained, and the members may be configured to perform other functions, in other embodiments.

As used herein, the term "filesystem" (sometimes spelled "file system") refers to a computing system and structure for storing and organizing computer directories, files, and data. File names are typically used by a filesystem to manage storage locations in a computer-readable storage medium for a file. Filesystems also employ directories and subdirectories that further associate file names with files by connecting the file name to an index in a file allocation table, or similar structure. A filesystem may further include records that reference a variable length store of related data, a key, and optionally other metadata, including, for example, owner identifiers, group identifiers, access permission settings, and the like. Keys enable the filesystem to locate and identify types of data, including whether the data represents a file, a directory, subdirectory, or the like. In one embodiment, a key may be implemented as a key value pair providing a pointer to an entry in the filesystem. Keys may be organized into a key space, which may be implemented, in one embodiment, as a hash table of the key value pairs, or a base data offset of a file name for which the key is associated. In one embodiment, a key space may be associated with a file directory, such that a directory key space may provide structure, location, and other identifying information to content associated with a given directory. However, in another embodiment, a key space may be associated with an entire filesystem, or slices of a filesystem.

As noted, a filesystem may organize its files using a structure called a file directory structure, file directory, or simply, a directory. For example, a given file directory may organize files within a hierarchical structure that includes a top level directory with zero or more subdirectories. Each directory (including subdirectories) may include zero or more files, and zero or more subdirectories. The files may represent various data, including, but not limited to structured and/or unstructured data. Structured data may include, for example, data stored in a fielded form, such as in databases or annotated (semantically tagged) in documents. Unstructured data may include, for example, HTML data, audio data, video data, image data, computer program data, email, text files, word processing documents, streamlining data, and the like.

File directories may be organized using a balanced or an unbalanced hierarchical structure. Balanced structures typically refer to those file directories that include approximately a same number or size of files and/or subdirectories within each branch of the hierarchy. That is, for a given directory that includes subdirectories, each subdirectory includes about the same number (or size) of files and/or subdirectories as every other subdirectory. A complete binary tree structure is one non-limiting example of a balanced file directory structure.

Unbalanced structures of file directories typically refer to those file directories where there is a disparate number or size of files, and/or subdirectories, within branches of the hierarchy of file directories. Often because of how a typical user might arrange and manage their data within a file directory, a large number of file directories are unbalanced. The filesystem tree walk useable for determining that is described herein, however, is designed to operate over balanced structures as well as unbalanced structures.

Movement through a file directory may be managed through use of a pointer, such as an iterator, a cursor, or the like that identifies a location or a position within a key space. The location may be identified through a pointer to a key space entry. A directory entry (or simply entry) refers to a key space entry that in turn points to a file or a subdirectory entry within a file directory. A subdirectory entry refers to a key space entry indicating that the directory entry is to a subdirectory. A file entry similarly refers to a key space entry indicating that the directory entry is to a file.

Managing work items that are to be performed over content within a file directory may be achieved using the pointer, which identifies a location within the key space (and in turn points to an entry within the file directory).

As used herein, the term "work item" refers to any of one or more actions that are to be performed upon an entry within the filesystem. Work items may include moving an entry from one location within the filesystem to another location within the filesystem (logically and/or physically), modifying an access permission upon the entry, or any of a variety of other actions. While work items may be applied to a single entry, a work item may also be applied to a plurality of entries. For example, a work item might include a request to copy a content of one or more file directories, type of files within a file directory, or the like, from one location to another location (again, logically and/or physically), including, for example, such as might be performed during backup, replication, or mirroring. Similarly, a work item may apply to a directory (or subdirectory). For example, a work item might include changing access permissions to a file directory (which may affect access to content associated—or within— the affected file directory), to entries within a file directory, including subdirectories, or the like.

As used herein, the term "cylinder group" refers to a filesystem that divides slices or portions of a disk cylinder in a storage device. These disk cylinders are grouped into cylinder groups, which are further divided into addressable blocks to control and organize the structure of files within the cylinder group. In one or more of the various embodiments, the file system is based on information for a plurality of cylinder groups. Also, each cylinder group may include at one or more known locations at least three types of data structures. A first data structure that describes every data block in the cylinder group, such as whether it is allocated, and to which file in the system the block belongs, and possibly what offset into the file the block exists at. A second data structure describes for every cylinder group, how many blocks in total are used. And the third data structure a mapping is provided from file ID to a location of the files inode. In the files's inode, is a pointer to the file's ID for the parent directory that points to that file.

Additionally, in one or more of the various embodiments, where the file system is based on information for a plurality of cylinder groups, each type of block has a different function in the file system. In most such filesystems, four types of blocks may be included. These four types of blocks often include: a boot block that includes information for booting the file system at startup; a data block that includes data for each file; and an inode block that includes all information about a file; and a super block which includes detailed information about the file system itself.

As used herein, the term "block maps" refers to a file system that maps a data block having a block address to a node and a storage device that is storing the data block. The term "reverse block map" refers to a process for reversing the block map of a data block to identify its storage device in a cylinder group and a node that corresponds to the data block. Once the node is identified, a directory is walked to find a file name that corresponds to the data block. Also, whether the node is a root node can be identified.

For the purposes of illustration, some embodiments are described in the context of Internet content-delivery and/or web hosting. However, the invention is not limited by the type of environment in which embodiments may be used, and that the embodiments may be used in other environments, such as, for example, the Internet, the World Wide Web, a private network for a business, a broadcast network for a government agency, an internal network of a corporate enterprise, an intranet, a local area network, a wide area network, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, one or more of the various embodiments are directed towards providing a statistical analysis of all files in a file system based on random sampling of data blocks to identify individual user consumption of file system resources and characteristics of the files stored in the file system. In one or more of the various embodiments, the file system is based on information for a plurality of cylinder groups. Also, each cylinder group may include at one or more known locations at least three types of data structures that enable reverse mapping of data blocks to root directories. A first data structure that describes every data block in the cylinder group, such as whether it is allocated, and to which file in the system the block belongs, and possibly what offset into the file the block exists at. A second data structure describes for every cylinder group, how many blocks in total are used. And the third data structure a mapping is provided from file ID to a location of the files inode. In the files's inode, is a pointer to the file's ID for the parent directory that points to that file.

Illustrative Operating Environment

Figure 1:
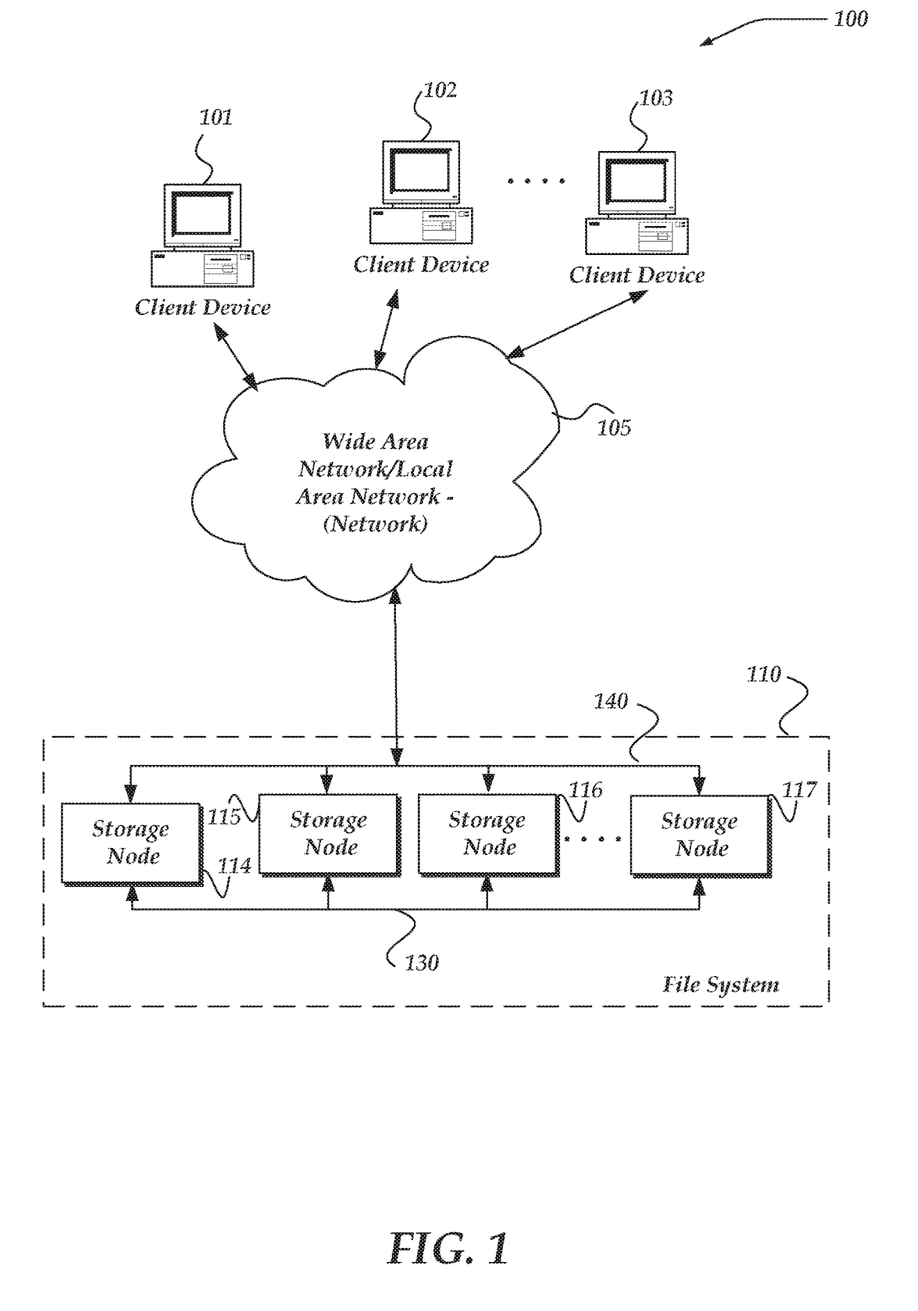
FIG. 1 illustrates a system overview diagram for one or more of the various embodiments.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices 101-103, local area networks ("LANs")/wide area networks ("WANs") (herein also "network") 105, and parallel filesystem 110. Parallel filesystem 110 includes smart storage nodes 114-117. As shown, client devices 101-103 communicate with various smart storage nodes 114-117 through network 105. Moreover, each of smart storage nodes 114-117 may communicate with each other over a reserved or separate communications link 130, or even over a common communications link 140. As the dashes within parallel filesystem 110 indicate, there may be more (or less) smart storage nodes than those illustrated.

Generally, client devices 101-103 may include virtually any computing device capable of receiving and sending a message over a network, such as wireless network, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client devices 101-103 may also include virtually any computing device that typically connects using a wired communications medium such as personal computers, multiprocessor systems, microprocessor-based or programmable consumer electronics, network PCs, or the like. In one embodiment, one or more of client devices 101-103 may also be configured to operate over a wired and/or a wireless network.

Client devices 101-103 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-103 also may include at least one other client application that is configured to provide, access and/or request a modification of content from another computing device, such as smart storage nodes 114-117. The client application may include a capability to provide and receive textual content, multimedia information, or the like. The client application may further provide information that identifies itself, including a type, capability, name, or the like. In one embodiment, client devices 101-103 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Network 105 is configured to couple client devices 101-103 with parallel filesystem 110. Network 105 may include any of a variety of wireless sub-networks that may further overlay stand-alone ad-hoc networks, or the like, to provide an infrastructure-oriented connection for client devices 101-103. Such sub-networks may include mesh networks, Wireless LAN (WLAN) networks, cellular networks, or the like.

Network 105 may further include an autonomous system of terminals, gateways, routers, or the like connected by wireless radio links, or the like. These connectors may be configured to move freely and randomly and organize themselves arbitrarily, such that the topology of network 105 may change rapidly.

Network 105 may further employ a plurality of access technologies including 2nd (2G), 3rd (3G), 4th (4G), 5$^{th}$ (5G) generation radio access for cellular systems, WLAN, Wireless Router (WR) mesh, or the like. Access technologies such as 2G, 2.5G, 3G, 4G, 5G, and future access networks may enable wide area coverage for client devices, such as client devices 101-103 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), Long Term Evolution, LTE, Bluetooth, or the like.

Network 105 is further enabled to employ any form of computer readable transport media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Filesystem 110 represents one of the various embodiments that may be employed for providing and managing data storage. It should be recognized that other configurations of a file system can also be employed. However, as disclosed, filesystem 110 may be configured to enable distributed data management across each of storage nodes 114-117 operating as peers within a cluster to create a single, shared pool of storage for a filesystem. As such, filesystem 110 provides cluster-aware symmetric multiprocessing capabilities that enable various work items to be redistributed between storage nodes 114-117, and thereby provide workload balancing.

One of the various embodiments of a network device usable as one of storage nodes 114-117 is described in more detail below in conjunction with FIG. 2. Briefly, however, storage nodes 114-117 are network devices that provide management of data stored thereon. In one of the various embodiments, storage nodes 114-117 may provide placement of files directly on storage mediums within and thereby improve a performance of a disk subsystem by optimally distributing files across the cluster of storage nodes 114-117.

Storage nodes 114-117 may operate as peers within filesystem 110. As such, a request to perform a work item received, for example, from one or more of clients 101-103 (or from a process within one of smart storage nodes 114-117), may be handled by any one of storage nodes 114-117. Storage nodes 114-117 may employ intra-cluster communications and/or synchronization over communication links 130 and/or 140 to perform a work item, maintain status, move slices of a file directory, and/or for the identification of possible disconnects of workers, or other entities. Use of communication links 130 and 140 further enable storage nodes 114-117 to provide a single virtual filesystem.

In one embodiment, storage nodes 114-117 are configured as a plug-and-play, high-density, rack-mountable appliance device that is optimized for high-throughput data delivery. In one embodiment, each of storage nodes 114-117 may provide its own data storage medium. Thus, as more storage space is needed or where one or more of storage nodes 114-117 fail, additional storage nodes may be installed using various mechanisms that do not require the entire filesystem 110 to be taken down, or otherwise cause an interruption of service. However, storage nodes 114-117 are not constrained to rack-mountable appliance devices, and other configurations may also be employed. For example, in one embodiment, storage nodes 114-117 may be replaced by a plurality of network devices that access data storage concurrently from a remote storage device that is accessible by more than one of the plurality of network devices, in parallel (or concurrently).

In one embodiment, each of storage nodes 114-117 may be configured substantially the same. However, the invention is not so limited. Thus, in another embodiment, for example, at least one of storage nodes 114-117 may be configured with a different type and/or amount of available computer-readable storage space.

Storage nodes 114-117, and thereby filesystem 110, may be configured to support a hot, standby storage node. The hot standby device may operate, in one embodiment, as an idle storage node that might not currently handling data storage. However, the hot standby device may be placed into use at any time one of the other active smart storage nodes fails. In one embodiment, the hot standby device may be aware of various transactions by other smart storage nodes such that there may be minimal time and/or data at risk during the failure recovery.

FIG. 1 illustrates that client devices 101-103 may communicate 'directly' with a given storage node 114-117 within filesystem 110. Such communications, in one embodiment, may be performed through various mechanisms, including use of a load balancing mechanism to select and/or direct client requests to a particular storage node. While client devices may communicate directly with a storage node in FIG. 1, other embodiments are also envisaged. For example, in another embodiment, a network device, operable as a server device, might be interposed between client devices 101-103, and filesystem 110. In this embodiment, client devices might communicate with the interposed server device, which in turn may load balance requests for data, requests to perform a work item, or the like, across smart storage nodes 114-117. Thus, system 100 of FIG. 1 is not to be construed as limiting the invention, and instead merely provides one of numerous other possible environments in which the invention may operate.

Illustrative Network Device Operable as a Storage Node

Figure 2:
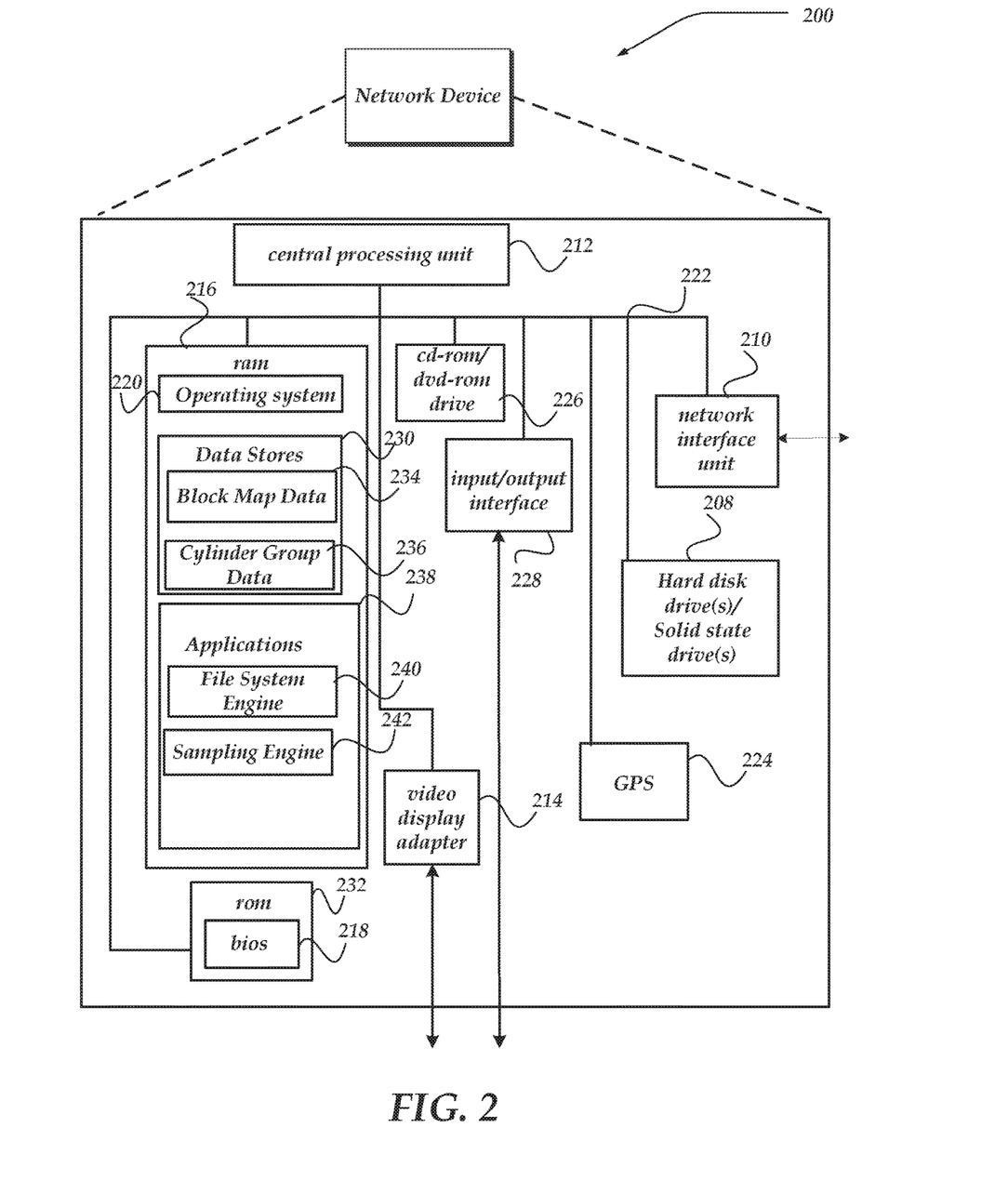
FIG. 2 shows an exemplary network device useable as a storage node in one or more of the various embodiments.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, any one or more of smart storage nodes 114-117 of FIG. 1.

Network device 200 includes one or more central processing units 212 (processors), video display adapter 214, and a mass memory, all in communication with each other via bus 222. The mass memory generally includes RAM 216, ROM 232, and one or more mass storage devices, such as hard disk drive 228, solid state drive, tape drive, optical drive, and/or floppy disk drive. The mass memory stores operating system 220 for controlling the operation of network device 200. In one embodiment, virtually any general-purpose operating system may be employed. However, in other embodiment, operating system 220 might be a special purpose operating system that provides, for example, a single intelligent mechanism to manage a filesystem that spans a plurality of nodes with a cluster. One non-limiting example of a special purpose operating system is OneFS® by Isilon Systems, Inc., of Seattle Wash.

Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC). In one or more of the various embodiments, client computer 200 may also include Global positioning systems (GPS) transceiver 224 that includes sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. GPS transceiver 224 may be one or more hardware sensors that collect or measure data that is external to network device 200

GPS transceiver 224 can determine the physical coordinates of network device 224 on the surface of the Earth, which typically outputs a location as latitude and longitude values. GPS transceiver 224 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network device 200 on the surface of the Earth. It is understood that under different conditions, GPS transceiver 224 can determine a physical location for network device 200. In one or more embodiment, however, network device 200 may, through other components, provide other information that may be employed to determine a physical location of the client computer, including for example, a Media Access Control (MAC) address, IP address, and the like.

In one or more of the various embodiments, applications, such as, operating system 206, sampling engine 242, files system engine 240, or the like, may be arranged to employ geo-location information to select one or more localization features, such as, time zones, languages, currencies, calendar formatting, local holidays, local weather conditions, culturally sensitive images, or the like. Localization features may be used in data objects, data models, reports, file systems, user-interfaces, as well as internal processes or databases. In one or more of the various embodiments, geo-location information used for selecting localization information may be provided by GPS 224. Also, in some embodiments, geolocation information may include information provided using one or more geolocation protocols over the networks, such as, wireless networks or wired networks.

The mass memory as described above illustrates another type of computer-readable media, namely computer readable storage media. It should be further recognized that computer-readable storage media might also be known as processor-readable storage media. Computer-readable storage media may include transitory, non-transitory, removable, and non-removable media implemented in any method or technology for storage of information, such as computer readable instructions, data structures, program modules, or other data. Examples of computer readable storage media include RAM, ROM, EEPROM, flash memory, solid state drives, or other memory technology, CD-ROM, digital versatile disks (DVD) or other optical storage, magnetic cassettes, magnetic tape, magnetic disk storage or other magnetic storage devices, or any other physical storage medium which can be used to store the desired information and which can be accessed by a computing device.

The mass memory also stores program code and data. For example, mass memory might include data stores 230. Data stores 230 may be include virtually any mechanism usable for storing and managing data, including but not limited to a file, a folder, a document, or an application, such as a database, spreadsheet, or the like. Also, data stores 230 may also include block map data 234 and cylinder group data 236 for filesystem engine 240. At least some of the information in data stores 230 may also reside on hard disk drive 228, cd-rom/dvd-rom drive 226, or other computer readable storage medium.

As shown, filesystem engine 240 is illustrated as residing in RAM. In one or more of the various embodiments, filesystem engine 240 may represent virtually any filesystem, including, but not limited to a distributed file system, a mirrored file system, a network file system, a shared disk file system, a clustered file system, or the like. In one embodiment, filesystem 240 may be a high-performance shared-disk clustered file system. Moreover, while filesystem 240 is illustrated within network device 200, in one embodiment, only a portion of filesystem engine 240 might reside within network device 200. Filesystem engine 240 might also be distributed across or even simultaneously mounted on a plurality of network devices, such as described below in conjunction with FIG. 3. In another embodiment, filesystem engine 240 might be mirrored using various techniques across a plurality of network devices.

In one embodiment, network device 200 might manage filesystem engine 240 across the plurality of network devices using a variety of communication protocols, including, but not limited to Network File System (NFS), Common Internet File System (CIFS), or the like.

One or more applications 238 may be loaded into mass memory and run on operating system 220. Examples of application programs may include transcoders, schedulers, calendars, database programs, word processing programs, HTTP programs, customizable user interface programs, IPSec applications, encryption programs, security programs, VPN programs, web servers, account management, mirroring services, and so forth. Applications 250 may include Sampling engine 242. It should be noted that while network device 200 shows just two applications, any number of applications may reside in a given network device.

Sampling engine 242 may include virtually any computing component or components configured and arranged to randomly sample data blocks in cylinder groups of file system engine 240.

System Architecture

Figure 3:
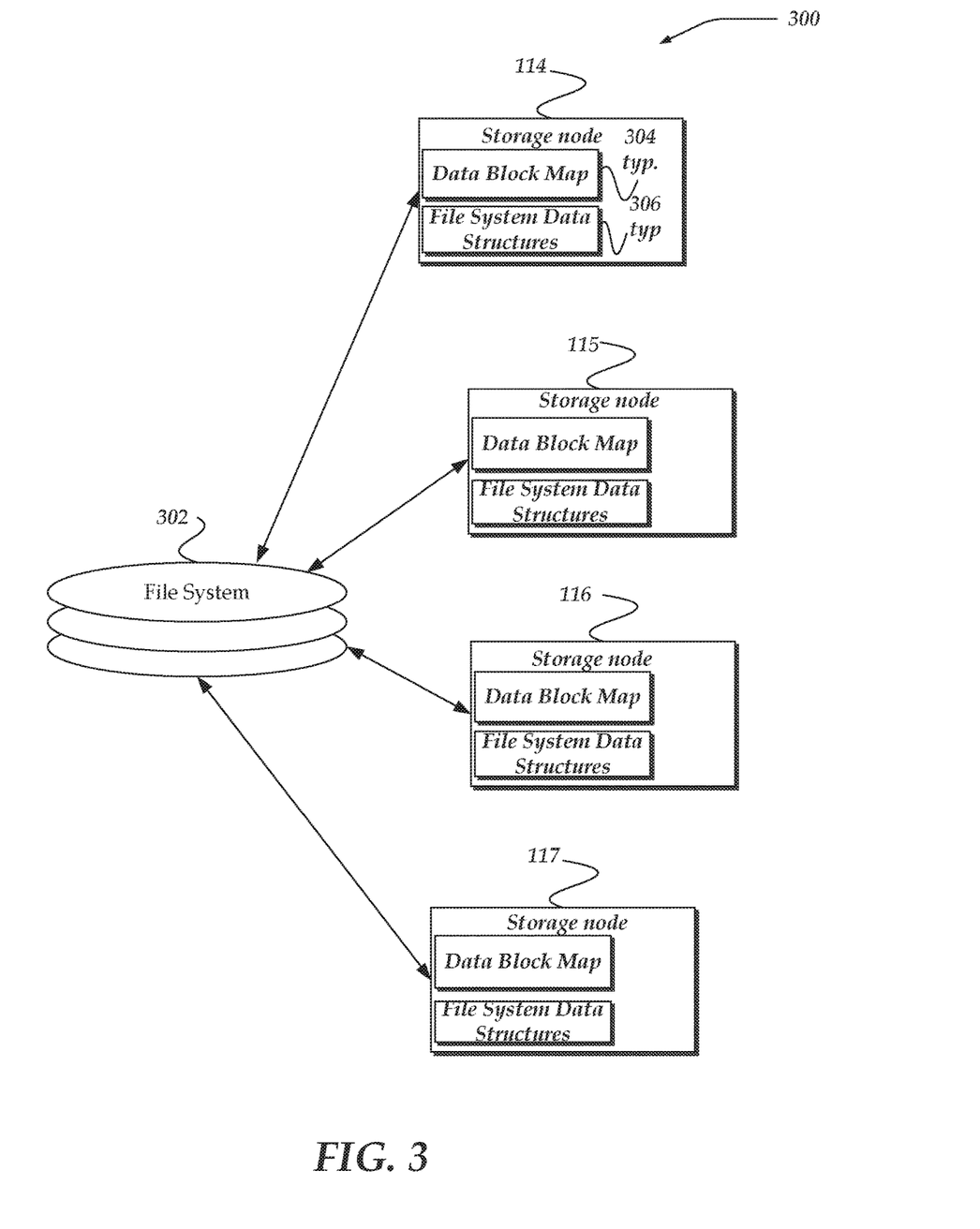
FIG. 3 illustrates an exemplary logical structure of various components useable with one or more of the various embodiment.

FIG. 3 shows one embodiment of various components discussed above. Architecture 300 of FIG. 3 may include many more or less components than those shown. The components shown, however, are sufficient to disclose an illustrative architecture for practicing various embodiments. Many of the components shown in FIG. 3 have been described above in conjunction with FIGS. 1-2.

Thus, architecture 300 shows storage nodes 114-117, and filesystem 302. Data block maps 304 and file system data structures 306 are distributed across one or more the storage nodes 114-117.

Filesystem 302 represents virtually any filesystem structure usable to store and otherwise organize computer files and other data. In one embodiment, the filesystem is distributed across or simultaneously mounted on, as described above, each of storage nodes 114-117. Thus, in one embodiment, although filesystem 302 is illustrated outside of storage nodes 114-117, portions of filesystem 302 may actually reside physically distributed across smart storage nodes 114-117. In one embodiment, by distributing filesystem 302 across the storage nodes 114-117 allows each node to manage the data within as a coherent peer to another node. If any of storage nodes 114-117 fails, data within filesystem 302 is still accessible through another node. However, other implementations of filesystem 302 are also envisaged.

In one embodiment, filesystem 302 may include data organized using a directory tree structure, where files may be associated with a given directory, and wherein zero or more directories, called subdirectories, may be organized under a top level directory.

Generalized Operations

Figure 4:
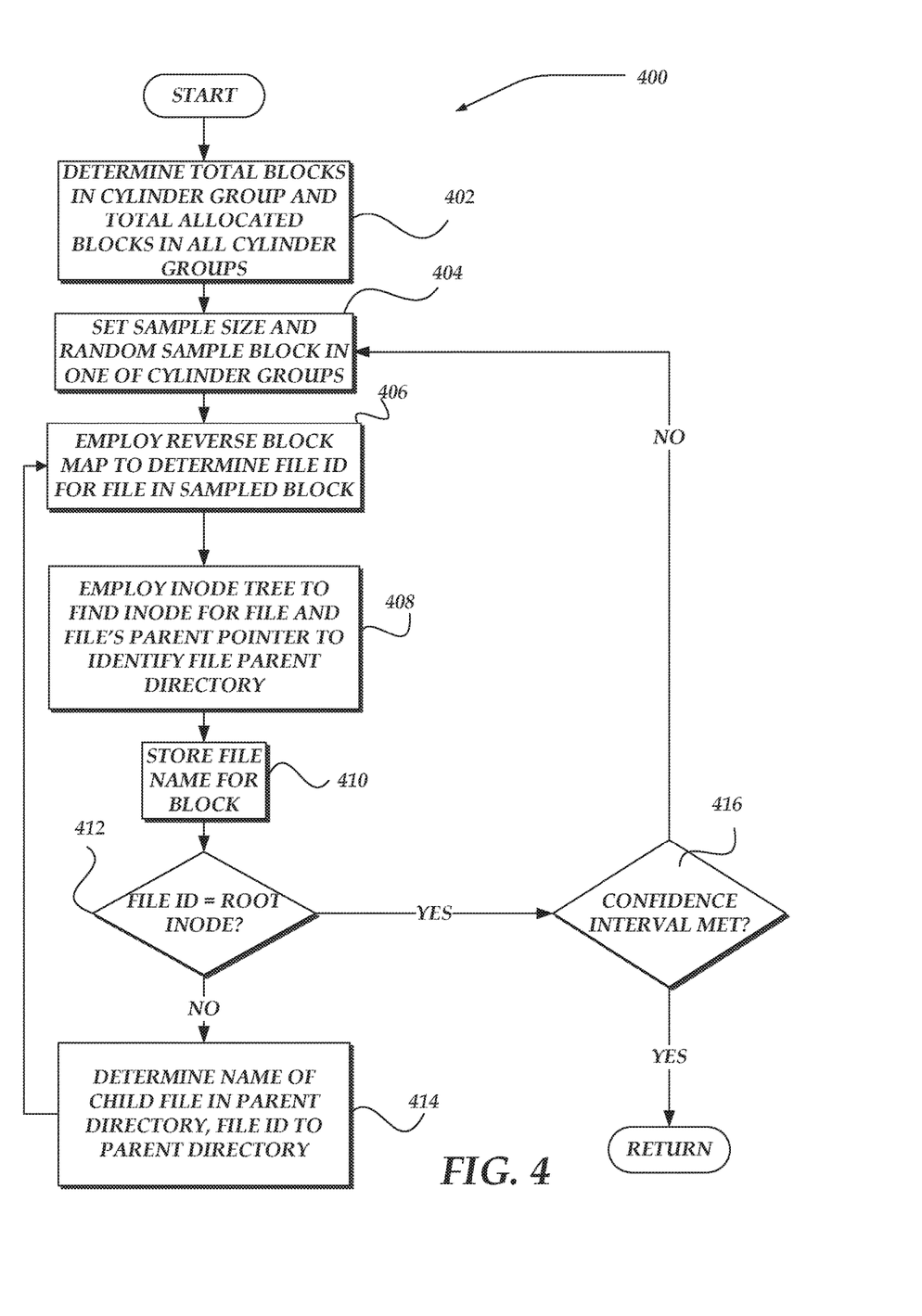
FIG. 4 shows an exemplary flow chart of a process of block sampling a file system to identify user consumption of storage resources.
Figure 5:
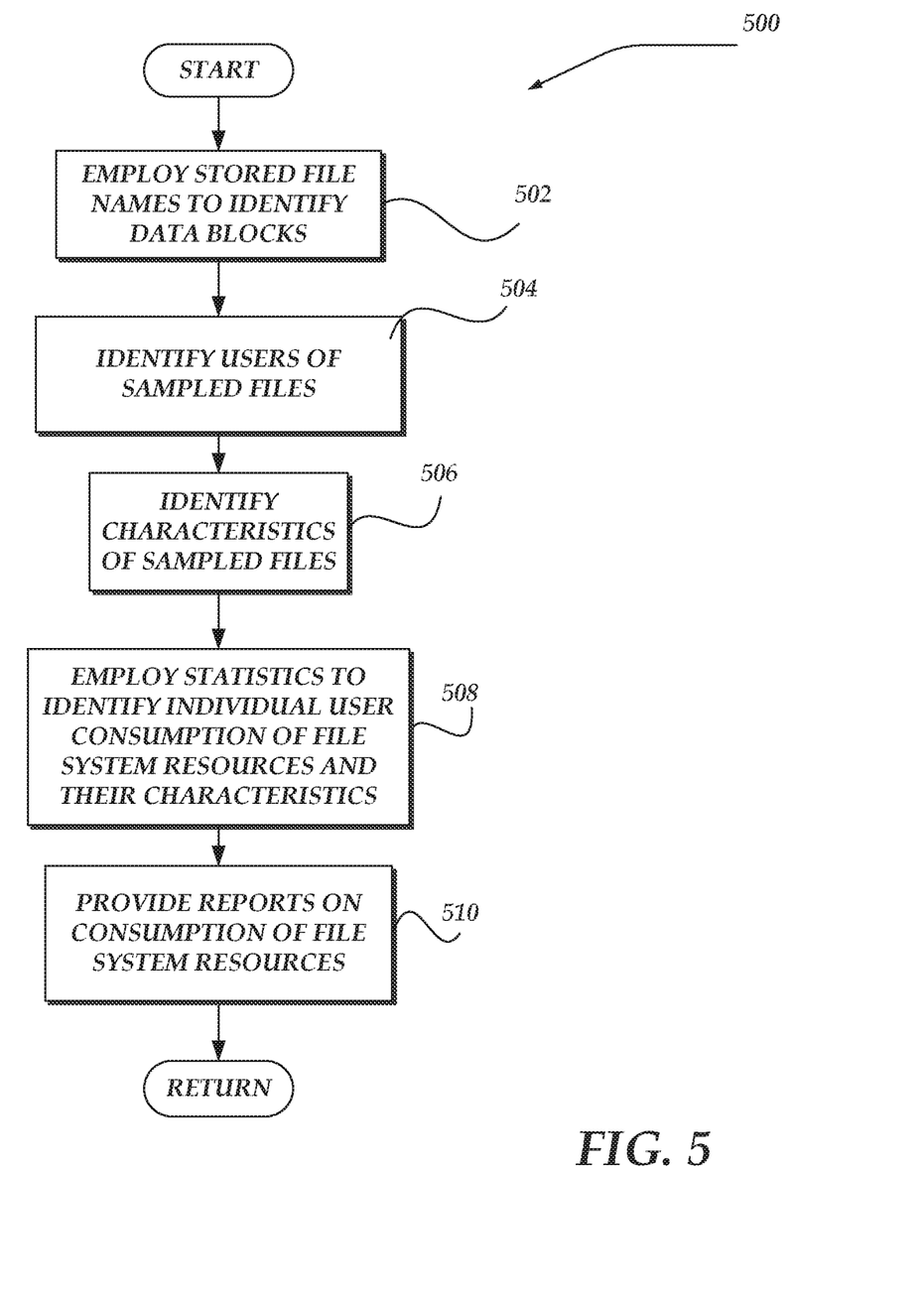
FIG. 5 illustrates an exemplary flow chart of a process for reporting results of individual user consumption of storage resources in a file system in accordance with various embodiments the invention.

FIGS. 4 and 5 are presented to illustrate flow charts for sampling blocks of data in a file system to statistically identify use of filesystem resources by individual users and statistical characteristics of the sampled files.

FIG. 4 shows flow chart 400 for a process to randomly sample addressable blocks in cylinder groups of a filesystem. Moving from a start block, the process advances to block 402 where a total number of blocks in a cylinder group are determined and a total number of allocated blocks in all of the cylinder groups. At block 404, a confidence interval for the statistical analysis of the files in the file system is set based on a number of randomly selected samples that are chosen to be performed on blocks of data in the cylinder groups.

Next, at block 406, reverse block mapping is performed on a randomly sampled addressable block to determine the file ID for a file associated with the sampled block. At block 408, an inode tree is employed to find an inode for the file. Also, the file's parent pointer is employed to identify the file's parent directory. Also, at block 410, the file name associated with the block is stored.

Flowing to decision block 412, a determination is made as to whether the file ID is associated with a root inode. If no, the process steps to block 414 where a name of a child file in the file's parent directory is looked up. Also, the file ID is advanced to the parent directory. Next, the process loops back to block 406, where substantially the same actions are performed again with the file ID at the parent directory level.

However, if the determination at decision block 412 was yes, then the process moves to decision block 416. If the confidence level is not met, i.e., not all of samples have been performed, the process loops back to block 406 and performs substantially the same actions as discussed above. On the other had, if all of the samples have been performed and the confidence level is met, then the process returns to performing other actions.

FIG. 5 shows flow chart 500 for a process that employs the result of the random samples of blocks to provide information. Moving from a start block, the process steps to block 502 and employs the stored file names to identify those blocks that were sampled. At block 504, one or more users and/or authors are identified of the files associated with the sampled blocks.

Also, at block 506, various characteristics of the sampled files are identified, including but not limited to: size of file, type of file, author, last user that accessed the file, last time a file was accessed, or other copies of the file.

Advancing to block 508, the process employs various types of statistical analysis to identify the percentage of consumption of file system resources by the actions of individual users and the characteristics of their files.

At block 510, reports, alerts, and other types of communication are provided to present information regarding percentage of data storage resource consumption by identified users. Next, the process returns to performing other actions.

What is claimed as new and desired to be protected by Letters Patent of the United States is:

1. A method for managing a file system, wherein one or more processors execute instructions that perform the method comprising:

providing information for a plurality of cylinder groups, wherein actions are performed to organize blocks of data as one or more files for each cylinder group, including:

employing a first data structure that includes information for each data block in the cylinder group, wherein the information includes allocation of the blocks of data, association of the blocks of data with the one or more files, and one or more offsets for the one or more files;

employing a second data structure to provide a number of the blocks of data that are currently used with the one or more files; and employing a third data structure to provide a mapping of a file identifier to a pointer for a parent directory of each file, wherein the pointer to the parent directory for each file is employed to provide a file name for each block of data; and determining individual user consumption of resources, by performing actions, including:

employing the first data structure to set a random sample size for the blocks of data in a cylinder group;

employing the third data structure to provide reverse mapping of a random sample of the selected block of data to a file identifier for a file included in the blocks of data;

employing a positive determination of a confidence interval to identify each file identifier that is associated with a root directory; and employing a negative determination of the confidence level to determine a name of a child file in the parent directory and move the file identifier to the parent directory.

2. The method of claim 1, wherein the cylinder group includes portions of data for a disk cylinder in a storage device that are grouped in addressable blocks of data.

3. The method of claim 1, further comprising:

employing a name of a file to identify a block of data, wherein the third data structure information is employed to identify a name of each file.

4. The method of claim 1, further comprising identifying one or more users of the one or more files associated with each sampled block of data.

5. The method of claim 1, further comprising identifying one or more characteristics of the one or more files associated with each sampled block of data, wherein the one or more characteristics include one or more of: size of file, type of file, author, last user that accessed the file, last time a file was accessed, or other copies of the file.

6. The method of claim 1, further comprising employing statistical analysis of each sampled block of data and one or more characteristics of the one or more files to identify data storage resource consumption by identified users of the file system.

7. The method of claim 1, further comprising employing a global positioning systems device to provide geolocation information that is employed to localize information presented in a report to one or more users of the file system.

8. A system for managing a file system over a network, comprising:
one or more server computers that include:
a memory for storing instructions;
one or more processors, wherein the one or more processors execute the instructions that perform a method comprising:
providing information for a plurality of cylinder groups, wherein actions are performed to organize blocks of data as one or more files for each cylinder group, including:
employing a first data structure that includes information for each data block in the cylinder group, wherein the information includes allocation of the blocks of data, association of the blocks of data with the one or more files, and one or more offsets for the one or more files;
employing a second data structure to provide a number of the blocks of data that are currently used with the one or more files; and
employing a third data structure to provide a mapping of a file identifier to a pointer for a parent directory of each file, wherein the pointer to the parent directory for each file is employed to provide a file name for each block of data; and
determining individual user consumption of resources, by performing actions, including:
employing the first data structure to set a random sample size for the blocks of data in a cylinder group;
employing the third data structure to provide reverse mapping of a random sample of the selected block of data to a file identifier for a file included in the blocks of data;
employing a positive determination of a confidence interval to identify each file identifier that is associated with a root directory; and
employing a negative determination of the confidence level to determine a name of a child file in the parent directory and move the file identifier to the parent directory.

9. The system of claim 8, wherein the cylinder group includes portions of data for a disk cylinder in a storage device that are grouped in addressable blocks of data.

10. The system of claim 8, further comprising:
employing a name of a file to identify a block of data, wherein the third data structure information is employed to identify a name of each file.

11. The system of claim 8, further comprising identifying one or more users of the one or more files associated with each sampled block of data.

12. The system of claim 8, further comprising identifying one or more characteristics of the one or more files associated with each sampled block of data, wherein the one or more characteristics include one or more of: size of file, type of file, author, last user that accessed the file, last time a file was accessed, or other copies of the file.

13. The system of claim 8, further comprising employing statistical analysis of each sampled block of data and one or more characteristics of the one or more files to identify data storage resource consumption by identified users of the file system.

14. The system of claim 8, further comprising employing a global positioning systems device to provide geolocation information that is employed to localize information presented in a report to one or more users of the file system.

15. A non-transitory computer readable storage media that includes instructions for managing a file system, wherein one or more processors execute instructions that perform the method comprising:
providing information for a plurality of cylinder groups, wherein actions are performed to organize blocks of data as one or more files for each cylinder group, including:
employing a first data structure that includes information for each data block in the cylinder group, wherein the information includes allocation of the blocks of data, association of the blocks of data with the one or more files, and one or more offsets for the one or more files;
employing a second data structure to provide a number of the blocks of data that are currently used with the one or more files; and
employing a third data structure to provide a mapping of a file identifier to a pointer for a parent directory of each file, wherein the pointer to the parent directory for each file is employed to provide a file name for each block of data; and
determining individual user consumption of resources, by performing actions, including:
employing the first data structure to set a random sample size for the blocks of data in a cylinder group;
employing the third data structure to provide reverse mapping of a random sample of the selected block of data to a file identifier for a file included in the blocks of data;
employing a positive determination of a confidence interval to identify each file identifier that is associated with a root directory; and
employing a negative determination of the confidence level to determine a name of a child file in the parent directory and move the file identifier to the parent directory.

16. The non-transitory computer readable storage media of claim 15, wherein the cylinder group includes portions of data for a disk cylinder in a storage device that are grouped in addressable blocks of data.

17. The non-transitory computer readable storage media of claim 15, further comprising:
employing a name of a file to identify a block of data, wherein the third data structure information is employed to identify a name of each file.

18. The non-transitory computer readable storage media of claim 15, further comprising identifying one or more users of the one or more files associated with each sampled block of data.

19. The non-transitory computer readable storage media of claim 15, further comprising identifying one or more characteristics of the one or more files associated with each sampled block of data, wherein the one or more characteristics include one or more of: size of file, type of file, author, last user that accessed the file, last time a file was accessed, or other copies of the file.

20. The non-transitory computer readable storage media of claim 15, further comprising employing statistical analysis of each sampled block of data and one or more characteristics of the one or more files to identify data storage resource consumption by identified users of the file system.

* * * * *